UNITED STATES PATENT OFFICE.

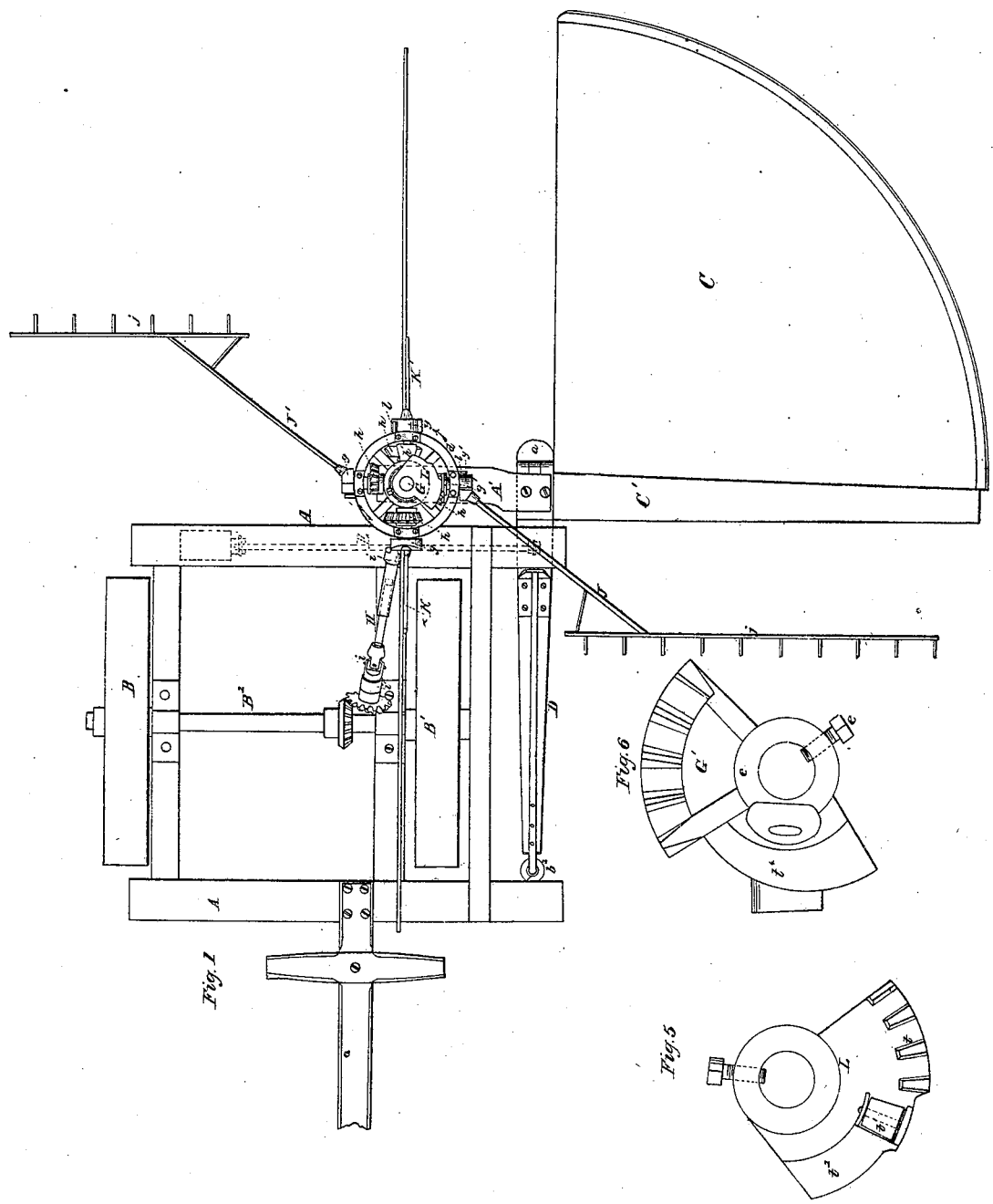

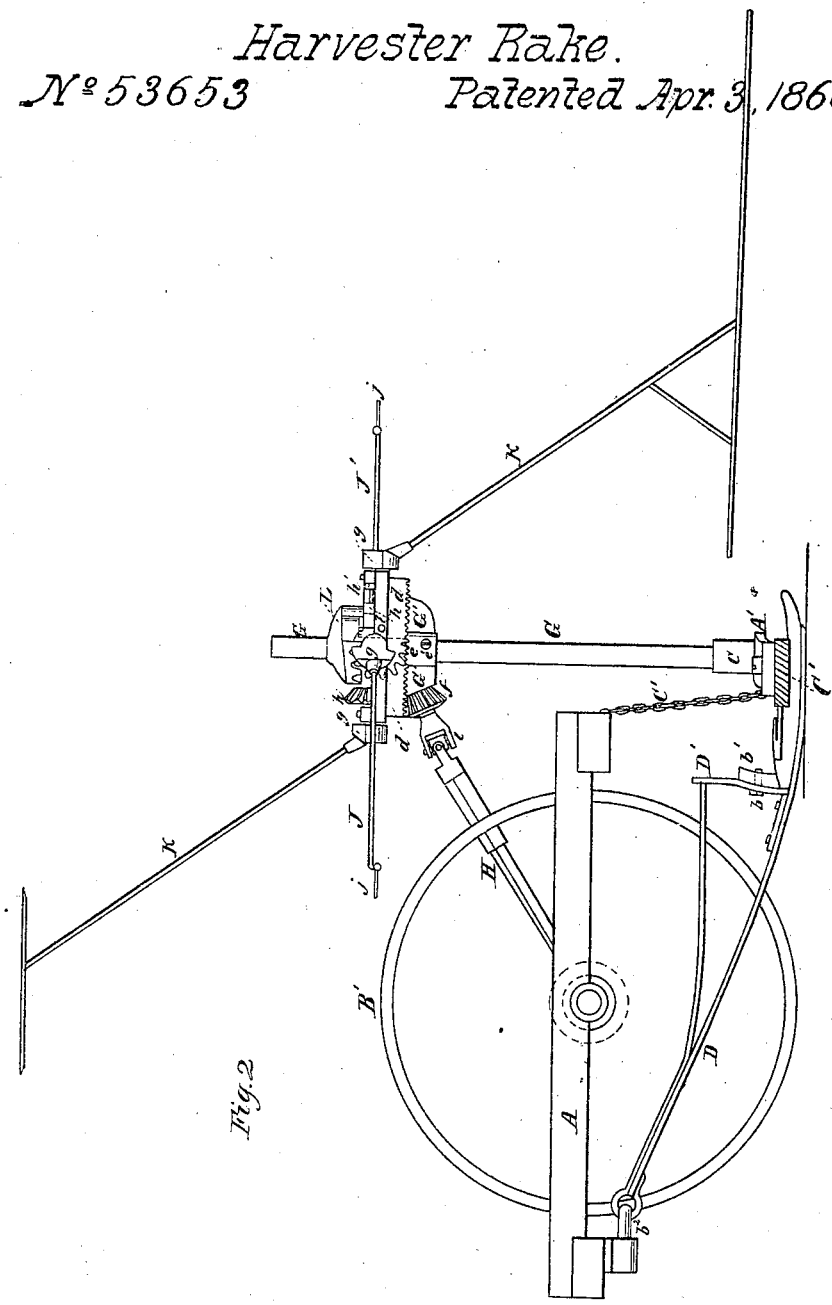

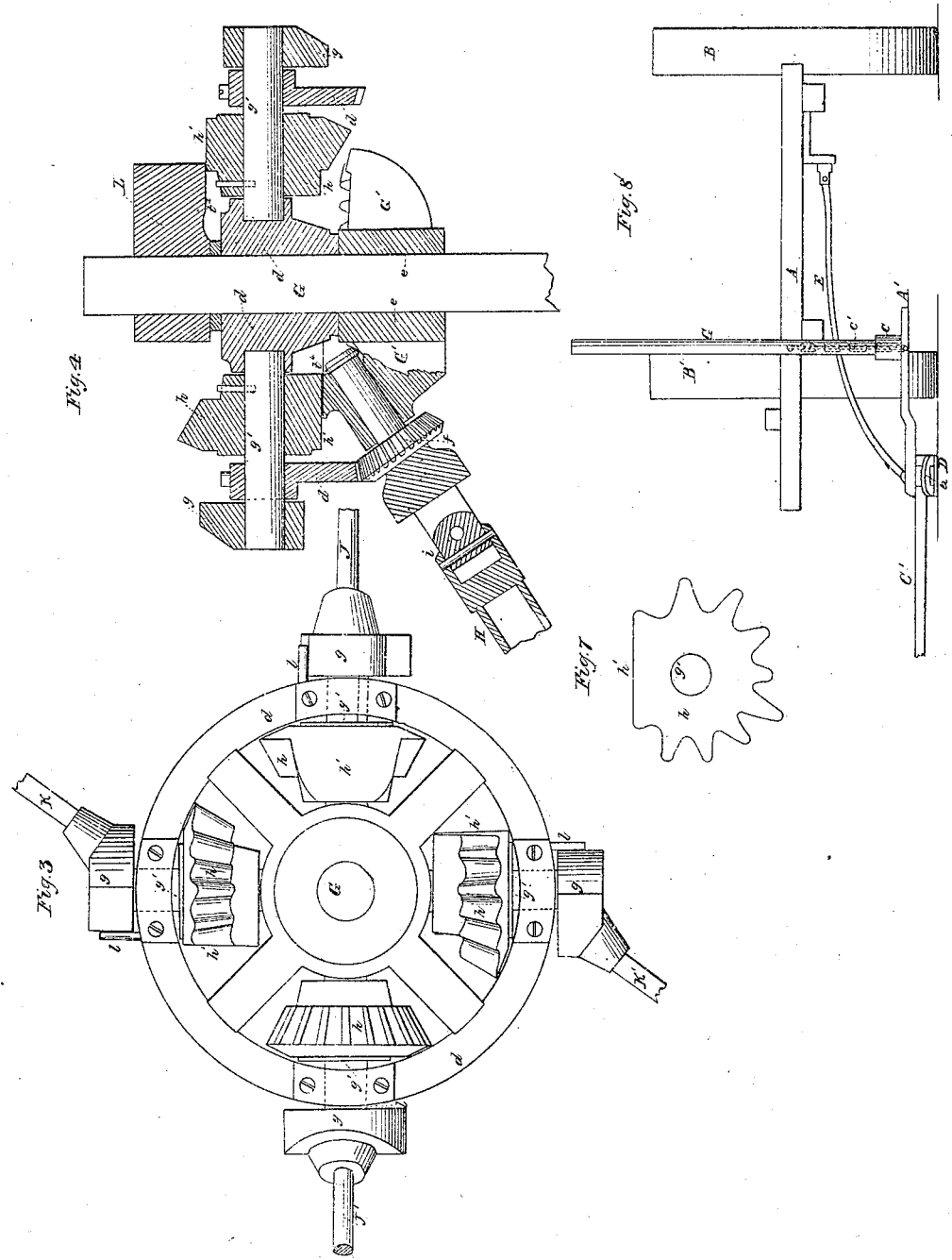
C. Moul.
Harvester Rake.
Nº 53653   Patented Apr. 3, 1866.

C. MOUL, OF HANOVER, PENNSYLVANIA.

IMPROVEMENT IN HARVESTER-RAKES.

Specification forming part of Letters Patent No. 53,653, dated April 3, 1866.

*To all whom it may concern:*

Be it known that I, C. MOUL, of Hanover, in the county of York and State of Pennsylvania, have invented a new and Improved Harvesting-Machine; and I do hereby declare that the following is a full, clear, and exact description thereof, reference being had to the accompanying drawings, making a part of this specification, in which—

Figure 1 is a plan view of the carriage-frame, platform, and rake. Fig. 2 is an elevation of the rake mechanism. Fig. 3, Sheet 2, is a top view of the crown-wheel and its segments enlarged. Fig. 4, Sheet 2, is a vertical central section through the crown-wheel and its stationary segments. Fig. 5 is a bottom view of the upper stationary segment. Fig. 6 is a top view of the lower stationary segment. Fig. 7 is a view showing the form of one of the oscillating toothed segments. Fig. 8 is an elevation of the rear end of the machine with the rake and platform detached.

Similar letters of reference indicate corresponding parts in the several figures.

This invention relates to certain novel improvements on that class of harvesting-machines in which rakes which sweep the grain from a quadrant platform are supported by or upon the inner end of the platform or finger-beam so as to move in harmony with the platform, said rakes being driven from the main shaft of the draft-frame or the axle of the supporting-wheels in such manner as to admit of the rake mechanism moving in harmony with this platform without being thrown out of gear.

The nature of my invention consists in pivoting rake-arms to a horizontal revolving crown-wheel in such manner that all the rakes have motions which are independent of each other, and are operated so as to revolve about a central post, and also, during this revolution, to vibrate intermittently to sweep the grain from the platform and then to rise out of the way of the draft-frame.

To enable others skilled in the art to understand my invention I will describe its construction and operation.

In the accompanying drawings, A represents the draft-frame, which is mounted upon two wheels, B B', one of which is keyed to the axle $B^2$, so as to turn this axle, and the other is loose thereupon.

C is the platform, of a quadrant form, and C' is the finger-beam, which is bolted to the inner shoe, $a$. This shoe is hinged at its rear end to the rear end of a vibrating and oscillating bar, D, and again connected to this bar D by means of the set-screw $b$, that passes through a vertical slot in a plate, D', and enters a lip, $b'$, on the forward end of the shoe $a$, as shown in Fig. 2. By loosening the set-screw the forward end of the finger-beam can be adjusted according to the height which it may be desired to cut.

The forward end of the brace or drag-bar D is linked to a swivel-eye, $b^2$, which enters a bearing-plate beneath the forward transverse beam of the draft-frame. This bar D allows the outer end of the finger-beam to rise or fall, and it also allows the entire finger-beam to rise or fall bodily, so that it will accommodate itself to inequalities of the surface passed over.

A transverse brace-rod, E, is pivoted at one end to the shoe $a$, and at the opposite end to the draft-frame A, as shown in Fig. 8.

A' represents a short bar, which is bolted rigidly to the inner end of the finger-beam C'. This bar may form a part of the finger-beam, but I prefer to have it made separate and secured to this beam over the shoe $a$, so that its inner end will project inward and upward, terminating just in rear of the driving-wheel B'; or between the two wheels B B', at which point a tubular collar, $c$, is secured perpendicularly upon said bar A', for receiving the rake-post G.

Directly in front of the collar $c$ a chain, $c'$, is attached to the bar A', the upper end of which chain is attached to the rear beam of the draft-frame, as shown in Figs. 2 and 8. The point at which the chain $c'$ is connected to the bar A is the fulcrum about which the platform and its finger-beam vibrate, consequently the outer end of the finger-beam can vibrate without raising or lowering the bottom of the rake-post G. The rake-post and its raking-mechanism are sustained by the chain $c'$, although this post is connected to and caused to move with the finger-beam.

A crown-wheel, $d$, is applied to the post G, so as to move freely around it. This wheel $d$ is supported upon the hub $e$ of a toothed segment, G', shown clearly in Fig. 6, which is secured by a set-screw, $e'$, to post G. The hub $e$ also serves as a bearing for the upper end of an extensible shaft, H, which carries a pinion spur-wheel, $f$, that engages with the teeth on the lower edge of the crown-wheel $d$. (Shown in Figs. 2 and 4.)

The lower end of the extensible shaft H has a bevel spur-wheel keyed on it, which engages with the teeth of a corresponding wheel on the axle of the wheels B B', as shown in Fig. 1. The extensible shaft H is provided with universal coupling-joints $i$ $i$, and its lower end is supported and held by a bearing, $i'$, on the draft-frame A. The object of this shaft H is to allow the finger-beam and rake-post to rise or fall, or to vibrate freely, without stopping the motion of the crown-wheel or causing the gear-wheels to run hard or irregular.

The rake arms J J' and reel-arms K K' are secured to the segments $g$ $g$ on the outer ends of short radial shafts $g'$, which have their bearings on the crown-wheel $d$, as shown in Figs. 3 and 4, and are free to oscillate one-half of a revolution, so as to move the rakes $j$ $j$ down to a position for sweeping the grain to the platform, and then to elevate these rakes to such a height as will allow them to pass freely over the draft-frame. Each shaft $g'$ has a toothed segment, $h$, keyed on it, and each one of these segments is constructed with a plane surface, $h'$, and also with long and short teeth, about as I have represented in Fig. 7.

It will be seen by reference to Figs. 3 and 7 that the teeth of these segments $h$ are not only of different lengths, but that they are eccentric to the axes of their shafts. The object of thus forming the segments is to cause them to move the rakes downward toward the front end of the platform with a faster movement than they elevate these rakes after having cleared the platform of grain. These oscillating segments $h$ are acted upon by means of a segment, G', that is fast on the post G, as above stated, and also a segment, L, which is keyed on the post G above the crown-wheel $a$, as shown in Figs. 1, 2, and 4. This segment L is shown inverted in Fig. 5, and it is provided with teeth $t$ on its bottom surface, a friction-roller, $t'$, and a flat surface, $t^2$. The segment G' is similarly constructed, with this difference—there is no friction-roller, and the flat surface $t^4$ is much longer, as shown in Fig. 6.

The segment G' is arranged on the opposite side of the post G to the segment L. The latter is so arranged as to cause its teeth to engage with those on the oscillating segments $h$ as the crown-wheel revolves in the direction indicated by the arrow in Fig. 1, and to depress the rakes successively in front of the finger-beam. As the teeth on the segments $h$ leave those on the segment L the flat surfaces $h'$ on segments $h$ are brought squarely against the corresponding flat surface $t^2$ on the bottom of segment L. These flat surfaces, coming together at the proper times for the rakes to operate, will cause the rakes to move in a plane parallel with the surface of the platform during the raking stroke of each rake. As the rakes revolve around the post G, and after they have swept the grain from the platform, the flat surfaces of the oscillating segments $h$ leave the flat surface of the segment L, at which time the teeth on the segment $h$ are caught by the teeth on the segment G', which move the rakes backward and upward until the flat surfaces $h'$ are brought down upon the corresponding flat surface $t^4$ on the upper face of the segment G'. This carries the rakes over the draft-frame and brings them in a position to be depressed again by the teeth of the segments L $h$ engaging again, as above mentioned.

When the rakes are each brought down to make their raking strokes over the platform the flat surfaces on the fixed and movable segments will be brought together and the rakes will be prevented from being thrust backward by the resisting grain during the raking stroke. The rakes also move in a plane parallel to the platform as they move around over the draft-frame.

The pins $l$ $l$, which project from the circumference of the crown-wheel $d$, serve, in conjunction with the shoulders on the segments $g$ $g$, to prevent the shafts $g'$ from making more than a half-revolution about their axes.

The object of the single long tooth shown on the segments $h$ is to insure the engagement of the teeth of these segments with those on the fixed segments as the crown-wheel is revolved.

The anti-friction roller $t'$, on the bottom of the segment L, allows the flat surfaces of the segments $h$ to slide freely during the raking stroke when there is considerable resistance offered to the rake.

It will be seen by reference to the drawings that I employ two rakes, arranged opposite each other upon shafts which radiate from the center of the reel-post, and that I also employ two reels or gathering-arms, K K', which are also arranged opposite each other and affixed to shafts $g'$, whose axes radiate from the center of the reel-post. The same contrivances which operate the rakes will operate the reel-arms, and in the drawings I have represented the segments $h$ $g$ all of an equal size.

I am aware that rake and reel arms have been operated by means of a crown-wheel applied to a shaft or post which is supported upon the inner end of the finger-beam, and that such rake and reel arms were caused to revolve about an axis, and at the same time to rise and fall so as to pass freely over the draft-frame after raking the grain from a quadrant platform, and I do not claim these parts broadly.

I am also aware that the inner end of a finger-beam, having a reel mounted upon it, has been supported beneath the draft-frame by a chain-connection which will admit of the finger-beam rising and falling bodily, and also vibrating, and this I do not claim broadly.

I am also aware that a rake and reel has been mounted upon the inner end of the finger-beam or the platform so as to have independent movements of the draft-frame, and operated by means of an extensible shaft and a yielding belt-pulley, and these I do not claim broadly.

What I do claim as new, and desire to secure by Letters Patent, is—

1. Applying the rakes and the reel-arms to short radial shafts, $g'$, all of which have independent movements of each other, upon a revolving crown-wheel, $d$, substantially as described.

2. Giving an intermittent oscillating motion to each one of the shafts $g'$ by means of toothed segments $h$ and fixed segments G L, said segments being constructed with flat bearing-surfaces $h'$ $t^2$ $t^4$ for holding the rake and reel arms while passing over the platform and also over the draft-frame, substantially as described.

3. The combination of the anti-friction roller $t'$ with the plane surface $t^2$ of the toothed segment L and the flat surfaces of the oscillating segments $h$, substantially as described.

4. The combination of the upper and lower toothed segments with the intermediate revolving crown-wheel $d$ and the independent oscillating shafts $g'$, substantially as described.

5. The construction and arrangement of the segments $h$ $h'$, substantially as described.

C. MOUL.

Witnesses:
H. W. CLARK,
JOHN H. AULABAUGH.